US012074294B2

(12) United States Patent
Tong et al.

(10) Patent No.: US 12,074,294 B2
(45) Date of Patent: Aug. 27, 2024

(54) SOLID-STATE SODIUM-CARBON DIOXIDE BATTERY

(71) Applicant: China Glaze Co., Ltd., Hsinchu (TW)

(72) Inventors: Zizheng Tong, Beijing (CN); Shu-Bo Wang, Taipei (TW); Ru-Shi Liu, New Taipei (TW); Kun-Ta Tsai, Zhudong Township, Hsinchu County (TW); Sung-Yu Tsai, Zhudong Township, Hsinchu County (TW)

(73) Assignee: China Glaze Co., Ltd., Hsinchu (TW)

( * ) Notice: Subject to any disclaimer, the term of this patent is extended or adjusted under 35 U.S.C. 154(b) by 44 days.

(21) Appl. No.: 17/399,813

(22) Filed: Aug. 11, 2021

(65) Prior Publication Data
US 2022/0140406 A1 May 5, 2022

Related U.S. Application Data

(60) Provisional application No. 63/153,254, filed on Feb. 24, 2021, provisional application No. 63/067,198, filed on Aug. 18, 2020.

(51) Int. Cl.
*H01M 10/38* (2006.01)
*H01M 4/02* (2006.01)
(Continued)

(52) U.S. Cl.
CPC .......... *H01M 10/38* (2013.01); *H01M 4/133* (2013.01); *H01M 4/134* (2013.01); *H01M 4/136* (2013.01);
(Continued)

(58) Field of Classification Search
CPC .......... H01M 10/38; H01M 2004/028; H01M 2004/027; H01M 4/1399; H01M 4/133;
(Continued)

(56) References Cited

U.S. PATENT DOCUMENTS

2012/0214075 A1* 8/2012 Johnson ............ H01M 10/0563
429/405
2017/0187069 A1* 6/2017 Yim ....................... H01M 4/587
(Continued)

FOREIGN PATENT DOCUMENTS

CN  106450514 A   2/2017
CN  110521046 A   11/2019
(Continued)

OTHER PUBLICATIONS

Hu et al., Designing an All-Solid-State Sodium-Carbon Dioxide Battery Enabled by Nitrogen-Doped Nanocarbon (Year: 2020), Nano Lett. 2020, 20, p. 3620-3626.*
(Continued)

*Primary Examiner* — Brittany L Raymond
(74) *Attorney, Agent, or Firm* — Christensen, Fonder, Dardi & Herbert PLLC

(57) ABSTRACT

A solid-state sodium-carbon dioxide battery is provided. The solid-state sodium-carbon dioxide battery comprises a positive electrode, a negative electrode, and an inorganic solid-state electrolyte disposed between the positive electrode and the negative electrode, wherein the positive electrode can catalyze the reaction of sodium ions and carbon dioxide, the negative electrode comprises sodium.

10 Claims, 10 Drawing Sheets

(51) Int. Cl.
*H01M 4/133* (2010.01)
*H01M 4/134* (2010.01)
*H01M 4/136* (2010.01)
*H01M 4/1399* (2010.01)

(52) U.S. Cl.
CPC .... *H01M 4/1399* (2013.01); *H01M 2004/027* (2013.01); *H01M 2004/028* (2013.01)

(58) Field of Classification Search
CPC .. H01M 4/134; H01M 4/136; H01M 10/0562; H01M 4/38; H01M 4/381; H01M 4/48; H01M 4/58; H01M 4/587; H01M 2300/0068; H01M 2300/0071
See application file for complete search history.

(56) References Cited

U.S. PATENT DOCUMENTS

2019/0109358 A1\* 4/2019 Chai ............... H01M 12/00
2019/0165365 A1\* 5/2019 Zhamu .............. H01M 4/625
2021/0159547 A1 5/2021 Ikejiri et al.

FOREIGN PATENT DOCUMENTS

CN 110534778 A 12/2019
WO WO-2016069749 A1 \* 5/2016 .......... H01M 10/052

OTHER PUBLICATIONS

Hu, Xiaofei, et al., "Designing an All-Solid-State Sodium-Carbon Dioxide Battery Enabled by Nitrogen-Doped Nanocarbon," *NANO Letters*, vol. 20, pp. 3620-3626 (Mar. 26, 2020).

\* cited by examiner

SOLID-STATE SODIUM-CARBON DIOXIDE BATTERY

CLAIM FOR PRIORITY

This application claims the benefit of U.S. Patent Provisional Application No. 63/067,198 filed on Aug. 18, 2020, and U.S. Patent Provisional Application No. 63/153,254 filed on Feb. 24, 2021, the subject matters of which are incorporated herein in their entirety by reference.

BACKGROUND OF THE INVENTION

Field of the Invention

The present invention provides a sodium-carbon dioxide battery, and more specifically, a solid-state sodium-carbon dioxide battery having a specific solid-state inorganic electrolyte. The sodium-carbon dioxide battery of the present invention can be charged and discharged at room temperature.

Descriptions of the Related Art

Metal-air batteries are one of the up-and-coming areas of research from recent years. They combine the characteristics of conventional dry batteries and fuel batteries and utilize reactive gases (such as oxygen) as the reactants for the batteries. In comparison to common batteries, metal-air batteries have the advantages of being lightweight and high energy density. In general, in a metal-air battery, the anode (negative electrode) is a metal, the cathode (positive electrode) is a gas diffusion electrode, and the electrolyte is a salt solution. The electrical energy is provided through the potential difference generated by an oxidation-reduction reaction.

Due to the increasing awareness of the need for environmental protection, research on energy conservation and carbon emission reduction has attracted wide attention. Metal-air batteries that can utilize carbon dioxide, one of the greenhouse gases, to generate electrical energy have become the research focus of green energy. As lithium-ion batteries have been widely used, the price of lithium carbonate is rising year by year. Therefore, other metal elements that may replace lithium in the production of metal-air batteries have attracted attention.

However, in the prior art, the electrolytes of metal-air batteries are usually liquid electrolytes. The side reactions between metal ions and liquid electrolytes and the metal dendrites generated as a consequence may lead to the failure of the batteries. In addition, metal-air batteries are usually open battery systems, where the evaporation of liquid electrolytes may also lead to the failure of the batteries. Furthermore, short circuits caused by metal dendrites can lead to a massive release of heat energy. Furthermore, if the liquid electrolytes evaporate into organic gases, there is a risk of explosion.

SUMMARY OF THE INVENTION

Given the aforementioned problems, the present invention provides a sodium-carbon dioxide battery based on an inorganic solid-state electrolyte, wherein a specific inorganic solid-state electrolyte is used. The present invention can avoid the risk of explosion and battery failure problems existing in the aforementioned conventional metal-air batteries. In addition, in comparison to lithium, sodium has the advantages of being abundant in nature and low in price.

Therefore, an objective of the present invention is to provide a solid-state sodium-carbon dioxide battery, wherein the battery comprises a positive electrode, a negative electrode, and an inorganic solid-state electrolyte disposed between the positive electrode and the negative electrode, wherein the positive electrode can catalyze the reaction of sodium ions and carbon dioxide, the negative electrode comprises sodium.

In some embodiments of the present invention, the inorganic solid-state electrolyte is selected from the group consisting of $Na_3Zr_2Si_2PO_{12}$, $Na_{11}Sn_2PS_{12}$, $\beta\text{-}Al_2O_3$, and combinations thereof.

In some embodiments of the present invention, the material of the positive electrode is selected from the group consisting of $MoS_2$, $ZnCo_2O_4$, $ZnMn_2O_4$, $ZnS$, $ZnO$, $NiO$, $CoP$, $Ru$, $Ag$, $Au$, $Ir$, $Pt$, $Rh$, carbon nanotubes, graphite, graphene, soft carbon, hard carbon, hexagonal boron nitride, carbon nitride, carbon quantum dots, and combinations thereof.

In some embodiments of the present invention, the negative electrode comprises sodium and a non-sodium material.

In some embodiments of the present invention, the non-sodium material is selected from the group consisting of Al, Sn, Au, Ag, Si, soft carbon, hard carbon, graphite, carbon nanotubes, carbon fiber, coal, asphalt, carbon nitride, boron nitride, molybdenum disulfide, black phosphorus, MXene (a two-dimensional transition metal carbide, nitride, or carbonitride), carbon quantum dots, and combinations thereof.

In some embodiments of the present invention, the solid-state sodium-carbon dioxide battery further comprises at least one of a positive electrode interface layer, and a negative electrode interface layer, wherein the positive electrode interface layer is disposed between the positive electrode and the inorganic solid-state electrolyte, and the negative electrode interface layer is disposed between the negative electrode and the inorganic solid-state electrolyte.

In some embodiments of the present invention, the materials of the positive electrode interface layer and the negative electrode interface layer are each independently selected from the group consisting of succinonitrile, polyethylene oxide, polyacrylonitrile, polypropylene, polypropylene carbonate, polyvinylidene fluoride, hexafluoropropylene copolymer, sodium perchlorate, sodium hexafluorophosphate, sodium bis(trifluoromethanesulfonyl)imide, sodium bis(fluorosulfonyl)imide, reaction products obtained by co-heating sodium and $Na_3Zr_2Si_2PO_{12}$, and combinations thereof.

In some embodiments of the present invention, the solid-state sodium-carbon dioxide battery further comprises a casing, wherein the casing has a closed accommodating space; the positive electrode, the negative electrode and the inorganic solid-state electrolyte are positioned in the closed accommodating space; and the closed accommodating space is filled with carbon dioxide.

To render the above objectives, technical features and advantages of the present invention more apparent, the present invention will be described in detail with reference to some specific embodiments hereinafter.

DESCRIPTION OF THE PREFERRED EMBODIMENTS

Figure 1:
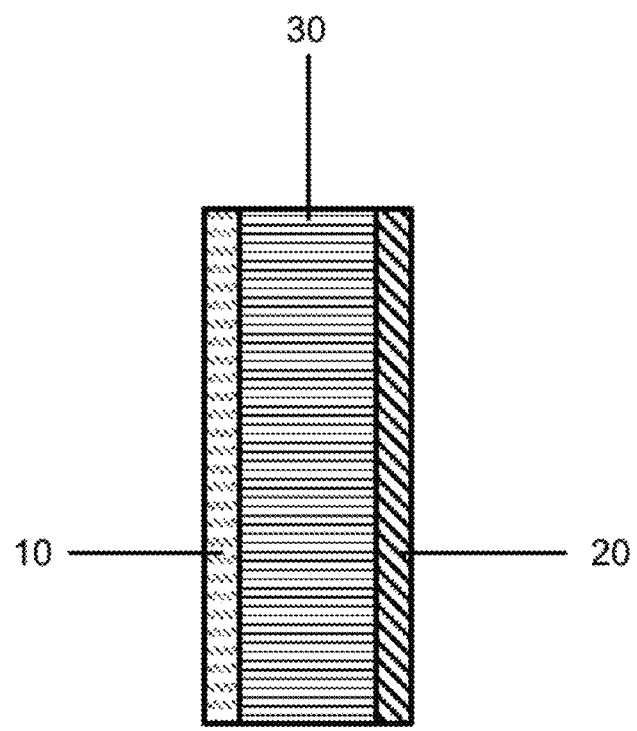
FIG. 1 is a structural schematic diagram showing an embodiment of the solid-state sodium-carbon dioxide battery of the present invention.

Hereinafter, some specific embodiments of the present invention will be described in detail. However, without departing from the spirit of the present invention, the present invention may be embodied in various embodiments and the scope of the inventions sought to be protected should not be limited to the embodiments described in the specification.

In the appended drawings, similar elements are denoted by similar reference numerals. The thickness of each layer and region may be exaggerated for clarity. Unless it is additionally explained, when a layer is described as being "on" another layer or a substrate, the layer can be directly on the other layer, or the substrate or intervening layer(s) may also be present.

Unless it is additionally explained, the expressions "a," "the," or the like recited in the specification and the appended claims should include both the singular and the plural forms.

Unless it is additionally explained in the specification and the appended claims, "positive electrode" refers to the cathode when the battery is in a discharged state, and "negative electrode" refers to the anode when the battery is in a discharged state.

The efficacy of the present invention compared to prior art lies in that a specific inorganic solid-state electrolyte is used in the metal-air battery, and the reaction is carried out between metal sodium and carbon dioxide, which can avoid the risk of explosion caused by metal dendrites and which complies with the environmental protection vision of energy conservation and carbon emission reduction. A detailed description of the constitution of the solid-state sodium-carbon dioxide battery of the present invention is provided below.

1. SOLID-STATE SODIUM-CARBON DIOXIDE BATTERY

The solid-state sodium-carbon dioxide battery of the present invention comprises a positive electrode, a negative electrode, and an inorganic solid-state electrolyte, wherein the positive electrode of the solid-state sodium-carbon dioxide battery can catalyze the reaction of sodium ions and carbon dioxide, the negative electrode comprises sodium, and the inorganic solid-state electrolyte comprises sodium ions. As shown in FIG. 1, the inorganic solid-state electrolyte 30 of the solid-state sodium-carbon dioxide battery of the present invention is disposed between the positive electrode 10 and the negative electrode 20, i.e., the positive electrode 10 and the negative electrode 20 are positioned on the two sides of the inorganic solid-state electrolyte 30.

The solid-state sodium-carbon dioxide battery of the present invention involves a reaction between carbon dioxide and sodium ions, which is represented by Chemical Equation (I) below. When discharging the battery, the carbon dioxide gas is reduced into carbon at the positive electrode, and sodium carbonate is produced. The sodium ions migrate from the negative electrode to the positive electrode, and the electrons are moved through the external circuit from the negative electrode to the positive electrode. When charging the battery, the carbon and sodium carbonate deposited at the positive electrode is decomposed into carbon dioxide, and sodium ions are released, the sodium ions migrate from the positive electrode to the negative electrode, and the electrons are moved through the external circuit from the positive electrode to the negative electrode.

$$3CO_2+4Na^++4e^- \rightleftarrows 2Na_2CO_3+C \quad \text{[Chemical Equation (I)]}$$

So that the carbon dioxide gas can be reduced into carbon at the positive electrode and sodium carbonate can be produced, the positive electrode of the solid-state sodium-carbon dioxide battery of the present invention comprises a material that can catalyze the reaction of sodium ions and carbon dioxide, or consists essentially of a material that can catalyze the reaction of sodium ions and carbon dioxide, or consists of a material that can catalyze the reaction of sodium ions and carbon dioxide. In some embodiments of the present invention, the material of the positive electrode is selected from the group consisting of $MoS_2$, $ZnCo_2O_4$, $ZnMn_2O_4$, ZnS, ZnO, NiO, CoP, Ru, Ag, Au, Ir, Pt, Rh, carbon nanotubes, graphite, graphene, soft carbon, hard carbon, hexagonal boron nitride, carbon quantum dots, and carbon nitride. Each of the materials of the positive electrode mentioned above can either be used alone or in any combination. In the appended Examples, the material of the positive electrode is carbon nanotubes with Ru nanoparticles loaded thereon.

The negative electrode of the solid-state sodium-carbon dioxide battery of the present invention comprises sodium to provide electrons (e⁻) and produce sodium ions in the process of discharging the battery.

In further embodiments of the present invention, the negative electrode is a sodium composite material comprising sodium and a non-sodium material. The non-sodium material is selected from the group consisting of Al, Sn, Au, Ag, Si, soft carbon, hard carbon, graphite, carbon nanotubes, carbon fiber, coal, asphalt, carbon nitride, boron nitride, molybdenum disulfide, black phosphorus, MXene, carbon quantum dots, and combinations thereof. In some of the appended Examples, the negative electrode is a sodium composite material obtained by compositing sodium and soft carbon. In comparison to the case of using sodium as the negative electrode, when the aforementioned sodium composite material is used as the negative electrode, the interface joint between the negative electrode and the inorganic solid-state electrolyte is more stable, and sodium ions are more easily transported at the interface between the negative electrode and the inorganic solid-state electrolyte, and therefore, the charge-discharge cycle number of the solid-state sodium-carbon dioxide battery can further be improved.

A technical feature of the solid-state sodium-carbon dioxide battery of the present invention lies in the use of inorganic solid-state electrolytes, thereby avoiding the generation of metal dendrites and battery failure caused by the metal dendrites. In some embodiments of the present invention, the inorganic solid-state electrolyte is selected from $\beta$-$Al_2O_3$, $Na_3Zr_2Si_2PO_{12}$, or $Na_{11}Sn_2PS_{12}$. The inorganic solid-state electrolyte above can either be used alone or in any combination. In the appended Examples, the inorganic solid-state electrolyte is a $Na_3Zr_2Si_2PO_{12}$ solid-state electrolyte sheet.

Figure 2:
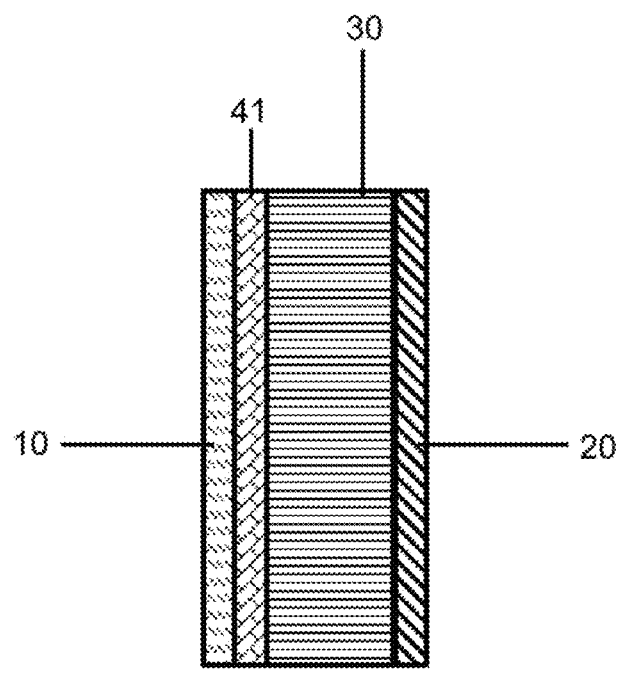
FIG. 2 is a structural schematic diagram showing another embodiment of the solid-state sodium-carbon dioxide battery of the present invention.
Figure 3:
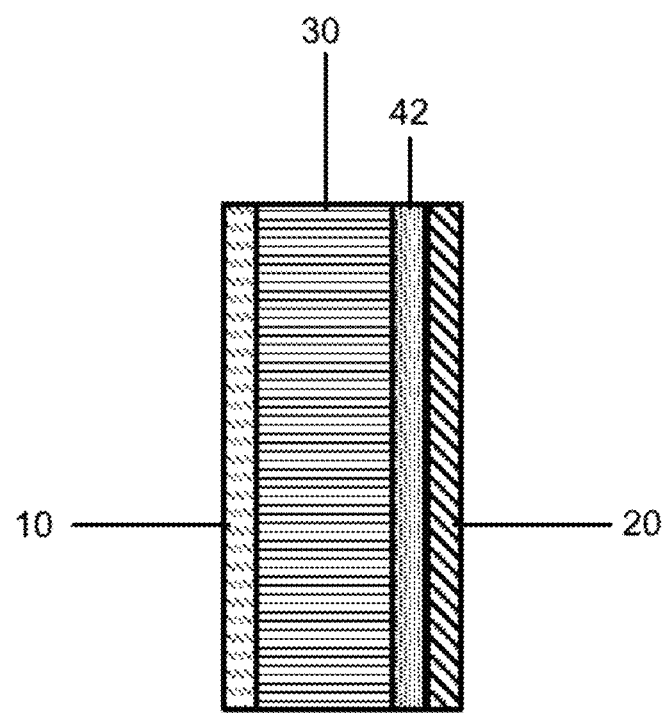
FIG. 3 is a structural schematic diagram showing another embodiment of the solid-state sodium-carbon dioxide battery of the present invention.
Figure 4:
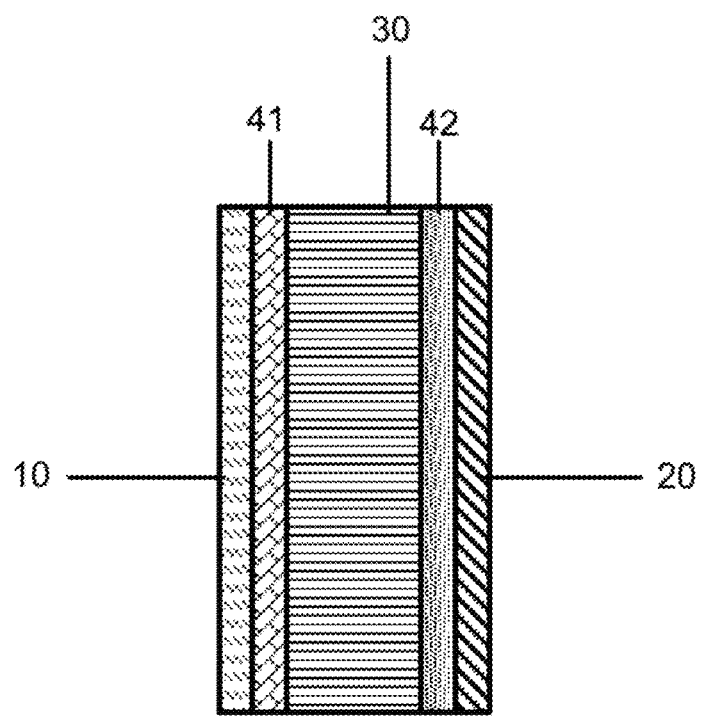
FIG. 4 is a structural schematic diagram showing another embodiment of the solid-state sodium-carbon dioxide battery of the present invention.

In some embodiments of the present invention, the solid-state sodium-carbon dioxide battery further comprises at least one of a positive electrode interface layer, and a negative electrode interface layer, wherein the positive electrode interface layer is disposed between the positive electrode and the inorganic solid-state electrolyte, and the negative electrode interface layer is disposed between the negative electrode and the inorganic solid-state electrolyte. FIGS. 2-4 each schematically show the embodiments of the solid-state sodium-carbon dioxide battery of the present invention comprising an interface layer, wherein FIG. 2 shows an embodiment of a solid-state sodium-carbon dioxide battery comprising a positive electrode interface layer 41 between the positive electrode 10 and the inorganic solid-state electrolyte 30; FIG. 3 shows an embodiment of a solid-state sodium-carbon dioxide battery comprising a negative electrode interface layer 42 between the negative electrode 20 and the inorganic solid-state electrolyte 30; FIG. 4 shows an embodiment of a solid-state sodium-carbon dioxide battery comprising a positive electrode interface layer 41 and a negative electrode interface layer 42. Utilizing the aforementioned setting of the interface layers, the solid-state sodium-carbon dioxide battery of the present invention may have an improved cycle life when the battery is used at a large current density.

The materials of the positive electrode interface layer and the negative electrode interface layer can be each independently selected from the group consisting of succinonitrile, polyethylene oxide, polyacrylonitrile, polypropylene, polypropylene carbonate, polyvinylidene fluoride, hexafluoropropylene copolymer, sodium perchlorate, sodium hexafluorophosphate, sodium bis(trifluoromethanesulfonyl)imide, sodium bis(fluorosulfonyl)imide, and reaction products obtained by co-heating sodium and $Na_3Zr_2Si_2PO_{12}$. Each of the materials of the interface layers above can either be used alone or in any combination.

An advantage of the solid-state sodium-carbon dioxide battery of the present invention lies in the use of carbon dioxide, one of the greenhouse gases, as the reactant gas, and thus being particularly suitable for use in energy development for hybrid vehicles and on the planet Mars. Especially since Mars exploration programs are being actively carried out by countries around the world, the solid-state sodium-carbon dioxide battery of the present invention is particularly suitable for associated space applications. The reason is that the atmospheric composition of Mars comprises up to 95.32% carbon dioxide, 2.7% nitrogen, and 1.6% argon, which is suitable for the application of the solid-state sodium-carbon dioxide battery of the present invention. Therefore, concerning Mars exploration programs and potential Mars immigration programs in the future, the solid-state sodium-carbon dioxide battery of the present invention is one of the important sources of electrical energy.

Furthermore, considering that the amount of carbon dioxide in the atmosphere of the Earth is only 0.03 vol %, the solid-state sodium-carbon dioxide battery of the present invention cannot be effectively operated directly using the carbon dioxide contained in the atmosphere of the Earth. Therefore, in some embodiments of the present invention, the solid-state sodium-carbon dioxide battery further comprises a casing, wherein the closed accommodating space provided by the casing is used to accommodate the positive electrode, the negative electrode, the inorganic solid-state electrolyte, and optional positive electrode interface layer or negative electrode interface layer; and the closed accommodating space can be filled with carbon dioxide as the reactive gas. In this regard, based on the total volume of the gases in the closed accommodating space, the concentration of carbon dioxide is preferably 90 vol % or more, such as 91 vol %, 92 vol %, 93 vol %, 94 vol %, 95 vol %, 96 vol %, 97 vol %, 98 vol %, 99 vol %, or 100 vol %, or within a range between any two of the values described herein, in order to obtain better battery performance.

2. EXAMPLES

2.1. Synthesis Example

Preparation of the Positive Electrode Sheet

The material of the positive electrode is carbon nanotubes with Ru nanoparticles loaded thereon (also referred to as "Ru/CNT" herein). Firstly, as the precursors, 20 mg of carbon nanotubes and 50 mg of ruthenium chloride hydrate (the weight ratio of the carbon nanotubes to the ruthenium chloride compound is 5:8) were added into 100 mL of anhydrous ethylene glycol, and the reaction was carried out by condensation reflux method under 170° C. for 3 hours. After the reaction was completed, the product was left to stand in the air for cooling. After that, the precipitated product was washed with ethanol and ultrapure water several times. Then the washed precipitated product was placed in a vacuum oven at 80° C. to dry for 12 hours, thereby obtaining Ru/CNT as the material of the positive electrode.

85 mg (85 wt %) of Ru/CNT and 15 mg (15 wt %) of polyvinylidene chloride were weighed and dissolved in 1 mL of N-methyl pyrrolidone. The mixture was ball-milled at a rotating speed of 3000 rpm for 2 hours to obtain a positive electrode slurry. 20 µL of the positive electrode slurry was taken and coated to a carbon paper with a radius of 4 mm. The carbon paper coated with the positive electrode slurry was dried under 80° C. for 12 hours, thereby obtaining a positive electrode sheet.

2.2. Preparation and Testing of the Solid-State Sodium-Carbon Dioxide Battery (I)

Example 1

Firstly, a $Na_3Zr_2Si_2PO_{12}$ solid-state electrolyte sheet (available from 421 Energy Inc. Ltd., South Korea) with a thickness of 1 mm and a radius of 6 mm was polished to have a glossy surface. The solid-state electrolyte sheet is a solid cylinder, wherein the thickness is the height and has only one radius. After that, a side of the $Na_3Zr_2Si_2PO_{12}$ solid-state electrolyte sheet has adhered with a sodium metal sheet as the negative electrode; and the opposite side of the solid-state electrolyte sheet has adhered with the positive electrode sheet prepared in the Synthesis Example, thereby forming a solid-state sodium-carbon dioxide battery.

Figure 5:
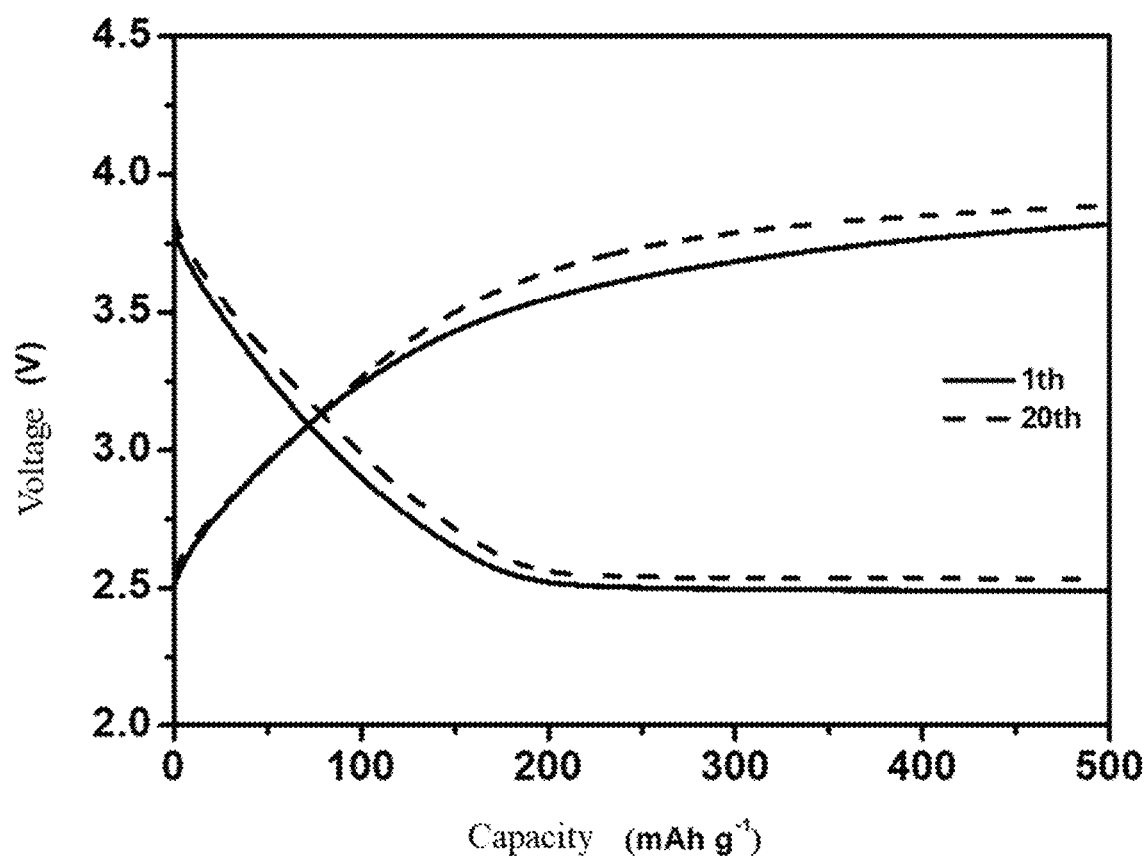
FIG. 5 is a diagram showing the charge-discharge curve of the solid-state sodium-carbon dioxide battery of Example 1.

The solid-state sodium-carbon dioxide battery was placed into a 5 L glass bottle with a cap, and the glass bottle was filled with carbon dioxide gas until the concentration of carbon dioxide reached 90% or more, and then the glass bottle was tightly capped. After the glass bottle and the battery were left to stand for 8 hours, the battery was charged and discharged at room temperature. As shown in FIG. 5, under the conditions of a current density of 100 mA/g and a cut-off capacity of 500 mAh/g, the solid-state sodium-carbon dioxide battery of Example 1 can repeat the charge-discharge cycle up to 20 times.

Example 2

Figure 6:
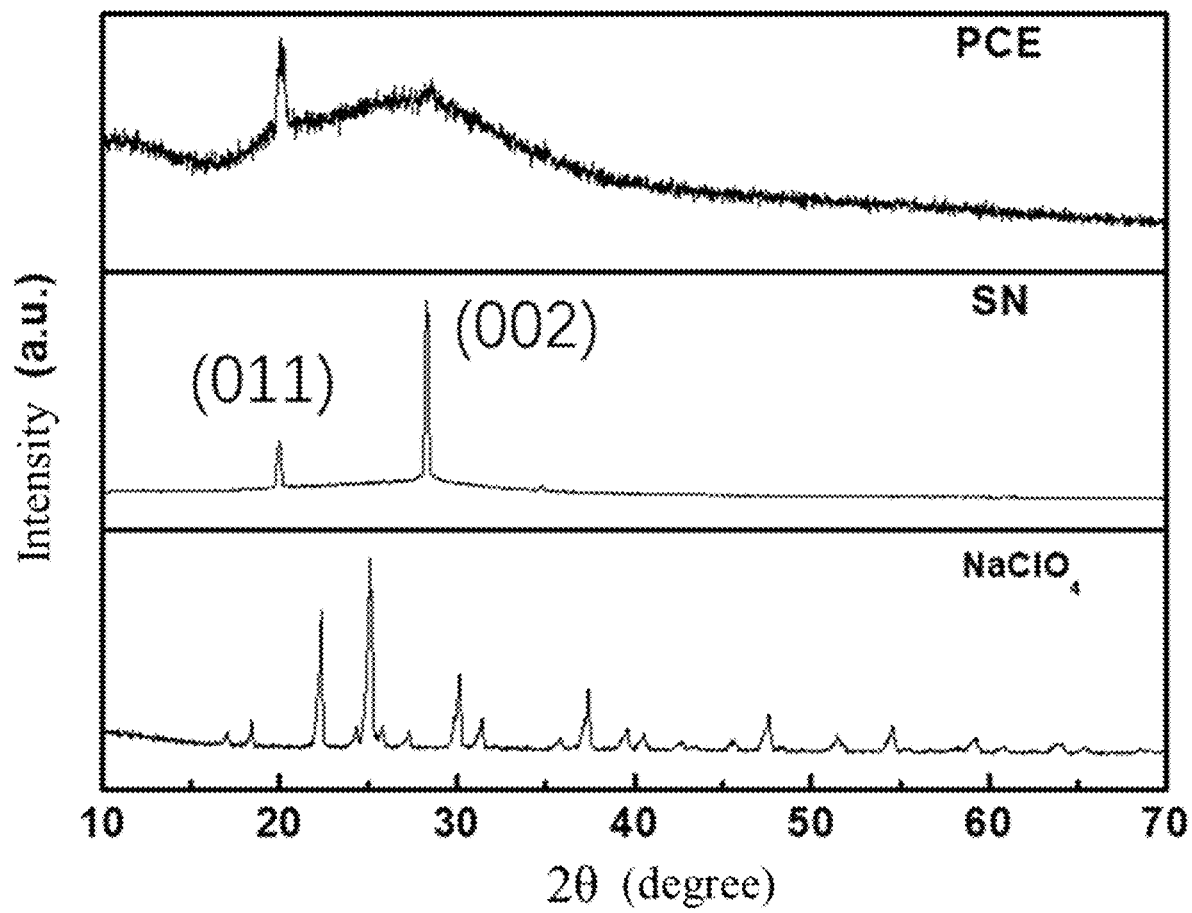
FIG. 6 is a diagram showing the X-ray diffraction spectrum of the positive electrode interface layer in the solid-state sodium-carbon dioxide battery of Example 2.

Firstly, 7.5 mg of sodium perchlorate was added into 92.5 mg of succinonitrile solution melted at 50° C. The mixture was mixed at a rotation speed of 600 rpm for 12 hours to obtain a succinonitrile solution containing 7.5 wt % of sodium perchlorate as the positive electrode interface layer coating solution. The positive electrode interface layer coating solution was coated on a specimen stage of 2 cm in length and 2 cm in width to form a test specimen of the positive electrode interface layer. The test specimen was placed into an X-ray diffractometer (model number: D2 phaser diffractometer, available from Bruker) for analysis, and an X-ray diffraction spectrum as shown in FIG. 6 was obtained. As shown in FIG. 6, the X-ray diffraction spectrum of sodium perchlorate is denoted with $NaClO_4$; the X-ray diffraction spectrum of succinonitrile is denoted with SN; the X-ray diffraction spectrum of the positive electrode interface layer is denoted with PCE. It can be seen from FIG. 6 that succinonitrile has two crystal planes labeled (001) and (002), showing that it is a long-term ordered structure. After succinonitrile was mixed with sodium perchlorate (i.e., PCE of FIG. 6), the (002) crystal plane disappeared and thus exhibiting an amorphous state, which shows that sodium perchlorate formed a plastic crystal interface layer in succinonitrile, thereby lowering the degree of long-term order of succinonitrile and changing the structure of succinonitrile. In addition, the diffraction peak of sodium perchlorate cannot be seen in the plastic crystal interface layer, so that it can be concluded that the sodium perchlorate was dissolved by the succinonitrile.

The above positive electrode interface layer coating solution was then used to prepare a battery. Firstly, a $Na_3Zr_2Si_2PO_{12}$ solid-state electrolyte sheet with a thickness of 1 mm and a radius of 6 mm was polished to have a glossy surface. After that, a side of the solid-state electrolyte sheet was coated with the positive electrode interface layer coating solution to form a positive electrode interface layer. After the positive electrode interface layer was cured at room temperature, the positive electrode sheet prepared in the Synthesis Example has adhered onto the positive electrode interface layer; and the opposite side of the solid-state electrolyte sheet was adhered with a sodium metal sheet as the negative electrode, thereby forming a solid-state sodium-carbon dioxide battery.

Example 3

Firstly, a $Na_3Zr_2Si_2PO_{12}$ solid-state electrolyte sheet with a thickness of 1 mm and a radius of 6 mm was polished to have a glossy surface. After that, a side of the solid-state electrolyte sheet has adhered with a sodium metal sheet as the negative electrode. The sodium metal sheet and the solid-state electrolyte sheet were co-heated at 200° C. for 1 hour. The two of them reacted and produced a negative electrode interface layer. After the sodium metal sheet and the solid-state electrolyte sheet were cooled to room temperature, the opposite side of the solid-state electrolyte sheet has adhered with the positive electrode sheet prepared in the Synthesis Example, thereby forming a solid-state sodium-carbon dioxide battery.

Figure 7:
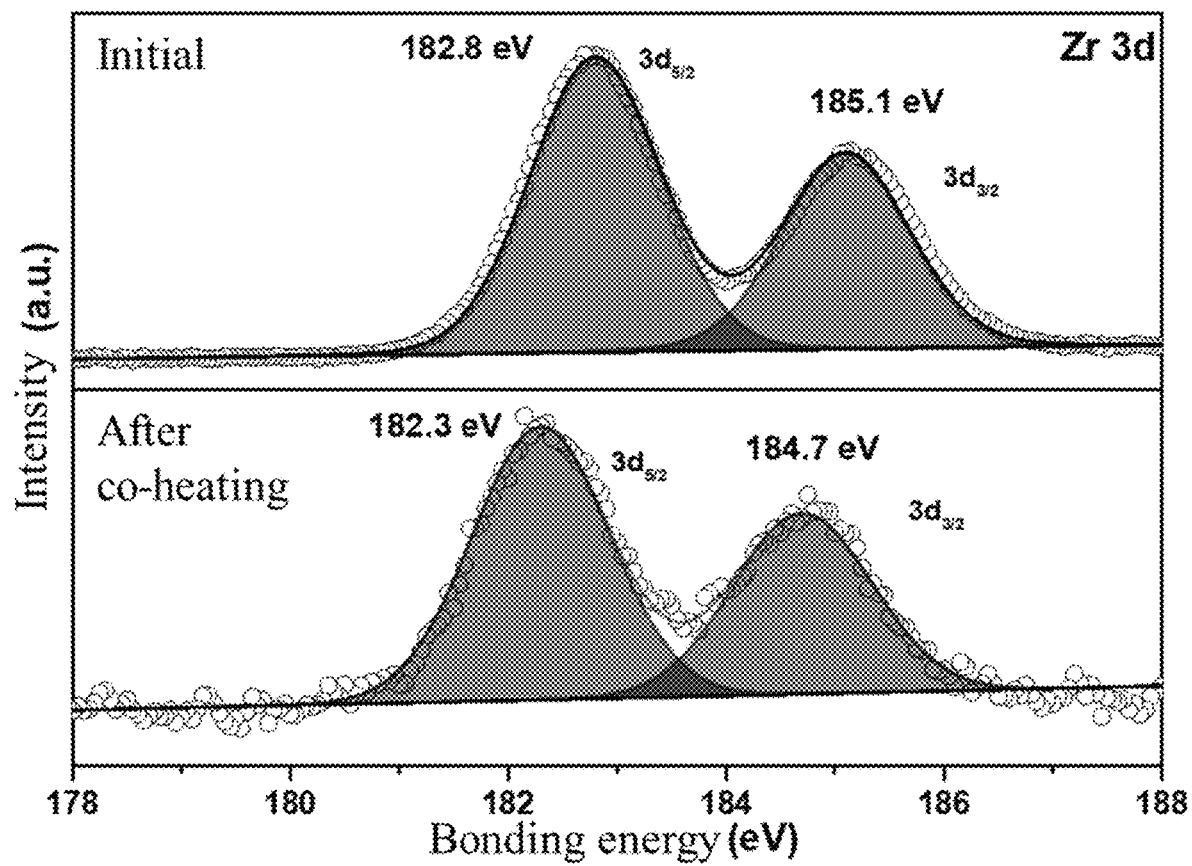
FIG. 7 is a diagram showing the X-ray photoelectron spectrum of the negative electrode interface layer in the solid-state sodium-carbon dioxide battery of Example 3.

The solid-state electrolyte sheet was subjected to X-ray photoelectron spectroscopy analysis before and after the sodium metal sheet, and the solid-state electrolyte sheet were co-heated, and the results are shown in FIG. 7, wherein "initial" denotes the solid-state electrolyte sheet before co-heating and therefore without forming a negative electrode interface layer; and "after co-heating" denotes the solid-state electrolyte sheet after co-heating and therefore with a negative electrode interface layer formed. It can be seen from FIG. 7 that the bonding energy of $3d_{5/2}$ and $3d_{3/2}$ of Zr of $Na_3Zr_2Si_2PO_{12}$ before co-heating are 182.8 eV (electron volts) and 185.1 eV, respectively. Due to the forming of the negative electrode interface layer, after co-heating, $3d_{5/2}$ and $3d_{3/2}$ of Zr of $Na_3Zr_2Si_2PO_{12}$ have migrated to 182.3 eV and 184.7 eV, respectively, which shows that $Zr^{4+}$ in $Na_3Zr_2Si_2PO_{12}$ was partially reduced, and the reduction of $Zr^{4+}$ caused alterations in the crystal structure, showing that a negative electrode interface layer was formed.

Example 4

Firstly, 7.5 mg of sodium perchlorate was added into 92.5 mg of succinonitrile solution melted at 50° C. The mixture was mixed at a rotation speed of 600 rpm for 12 hours to obtain a succinonitrile solution containing 7.5 wt % of sodium perchlorate as the positive electrode interface layer coating solution. After that, a $Na_3Zr_2Si_2PO_{12}$ solid-state electrolyte sheet with a thickness of 1 mm and a radius of 6 mm was polished to have a glossy surface, and then a side of the solid-state electrolyte sheet has adhered with a sodium metal sheet as the negative electrode. The sodium metal sheet and the solid-state electrolyte sheet were co-heated at 200° C. for 1 hour. The two of them reacted and produced a negative electrode interface layer. After the sodium metal sheet and the solid-state electrolyte sheet were cooled to room temperature, the opposite side of the solid-state electrolyte sheet was coated with the positive electrode interface layer coating solution to form a positive electrode interface layer. After the positive electrode interface layer was cured at room temperature, the positive electrode sheet prepared in the Synthesis Example was adhered to the positive electrode interface layer, thereby forming a solid-state sodium-carbon dioxide battery.

Figure 8:
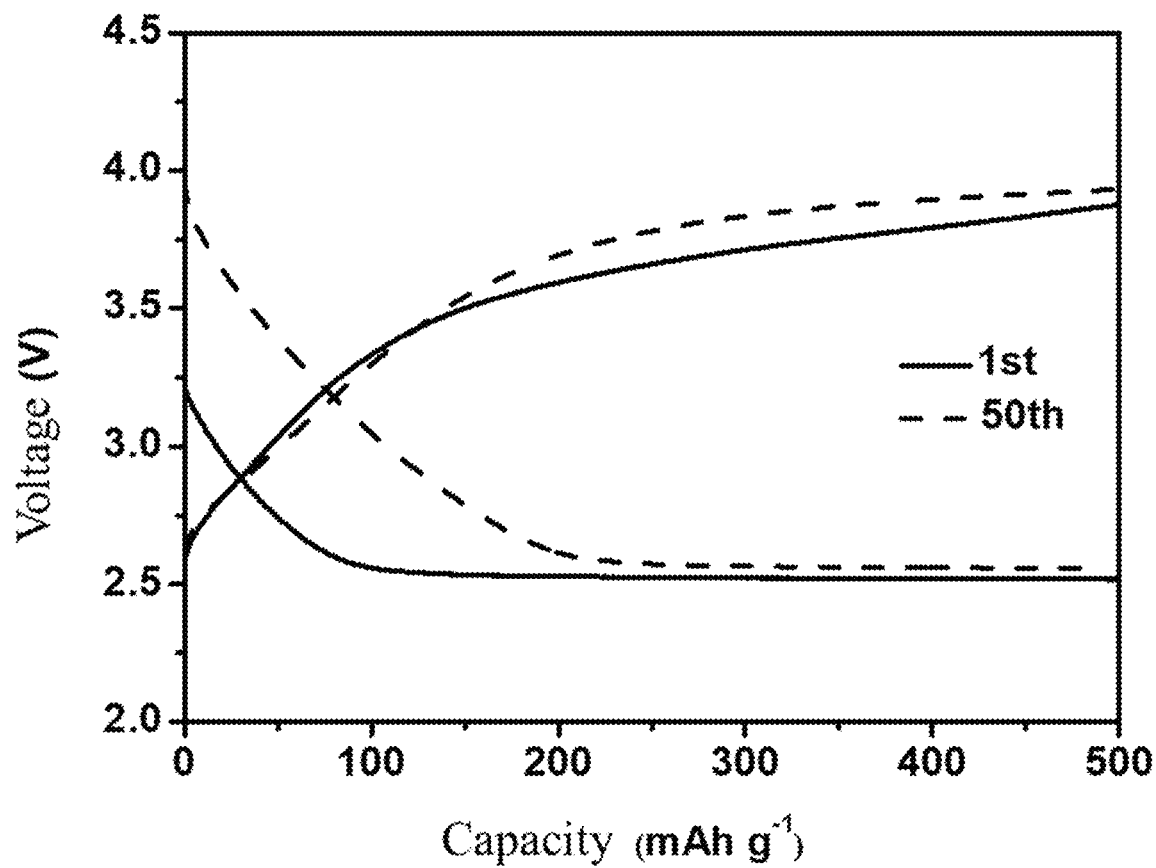
FIG. 8 is a diagram showing the charge-discharge curve of the solid-state sodium-carbon dioxide battery of Example 4.

The solid-state sodium-carbon dioxide battery was placed into a 5 L glass bottle with a cap, and the glass bottle was filled with carbon dioxide gas until the concentration of carbon dioxide in the glass bottle reached 90% or more, and then the glass bottle was tightly capped. After the glass bottle and the battery were left to stand for 8 hours, the battery was charged and discharged at room temperature. As shown in FIG. 8, under the conditions of a current density of 100 mA/g and a cut-off capacity of 500 mAh/g, the solid-state sodium-carbon dioxide battery of Example 4 can repeat the charge-discharge cycle up to 50 times.

2.3. High-Temperature Resistance Test of the Solid-State Electrolyte

The $Na_3Zr_2Si_2PO_{12}$ solid-state electrolyte used in the Examples above was subjected to calcination in air at 450°

Figure 9:
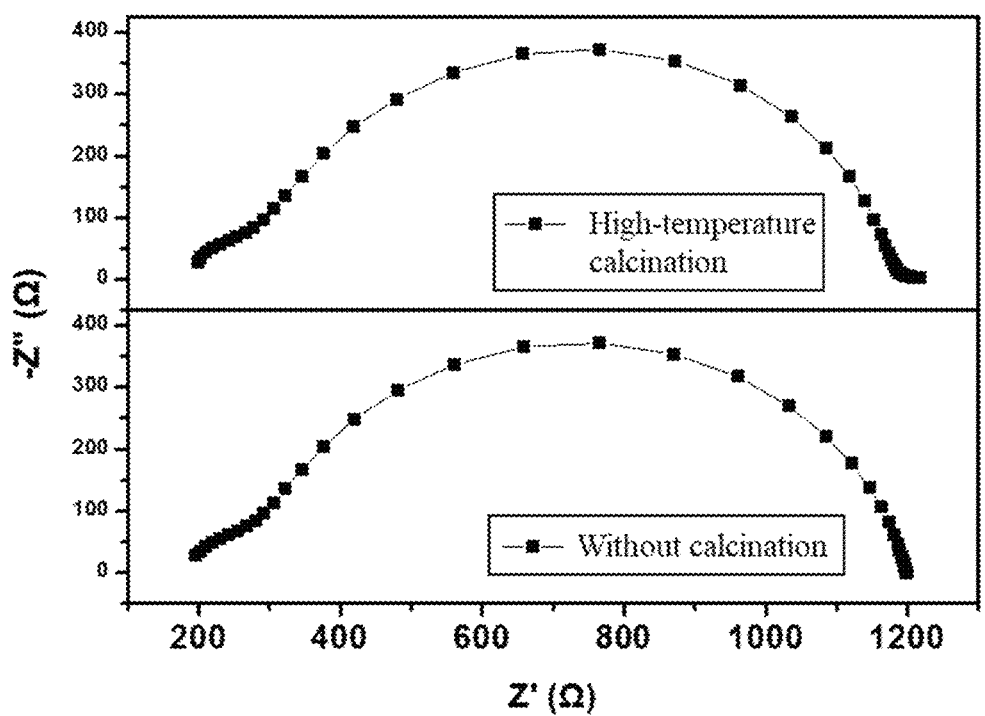
FIG. 9 is a diagram showing the electrochemical impedance spectrums of the solid-state electrolyte before and after calcination.

C. for 2 hours, and the electrochemical impedance of the Na|Na$_3$Zr$_2$Si$_2$PO$_{12}$|Na symmetric battery before and after calcination were measured to obtain the electrochemical impedance spectrums as shown in FIG. 9. It can be seen from FIG. 9 that there is no notable change in the impedance of the Na$_3$Zr$_2$Si$_2$PO$_{12}$ after calcining at an elevated temperature. In contrast to the present invention, polymeric solid-state electrolytes completely burned to ashes when calcined at 450° C. Therefore, the solid-state electrolyte used in the present invention has more excellent high-temperature resistance properties than polymeric solid-state electrolytes.

2.4. Preparation and Testing of the Solid-State Sodium-Carbon Dioxide Battery (II)

Example 5

Firstly, the material of the negative electrode was prepared. 50 mg of soft carbon and 950 mg of sodium were placed into a stainless-steel crucible, co-heated to 300° C., and maintained for 30 minutes, wherein the heating process was carried out in a glove box with argon protection. After heating, a negative electrode composed of well-dispersed sodium composite material (also referred to as "Na@C" herein) was obtained. After the Na@C was cooled to room temperature and solidified, it was cut into a circular thin sheet with a diameter of 1 cm and a thickness of 0.5 mm.

After that, a Na$_3$Zr$_2$Si$_2$PO$_{12}$ solid-state electrolyte sheet with a thickness of 1 mm and a diameter of 1.2 cm was polished to have a glossy surface, and then a side of the solid-state electrolyte sheet has adhered with the Na@C circular thin sheet as the negative electrode. The Na@C circular thin sheet and the solid-state electrolyte sheet were heated to 300° C. and maintained for 30 minutes so that the Na@C circular thin sheet and the solid-state electrolyte sheet tightly adhered together. The opposite side of the solid-state electrolyte sheet has adhered with the positive electrode sheet prepared in the Synthesis Example, thereby forming a solid-state sodium-carbon dioxide battery.

Figure 10:
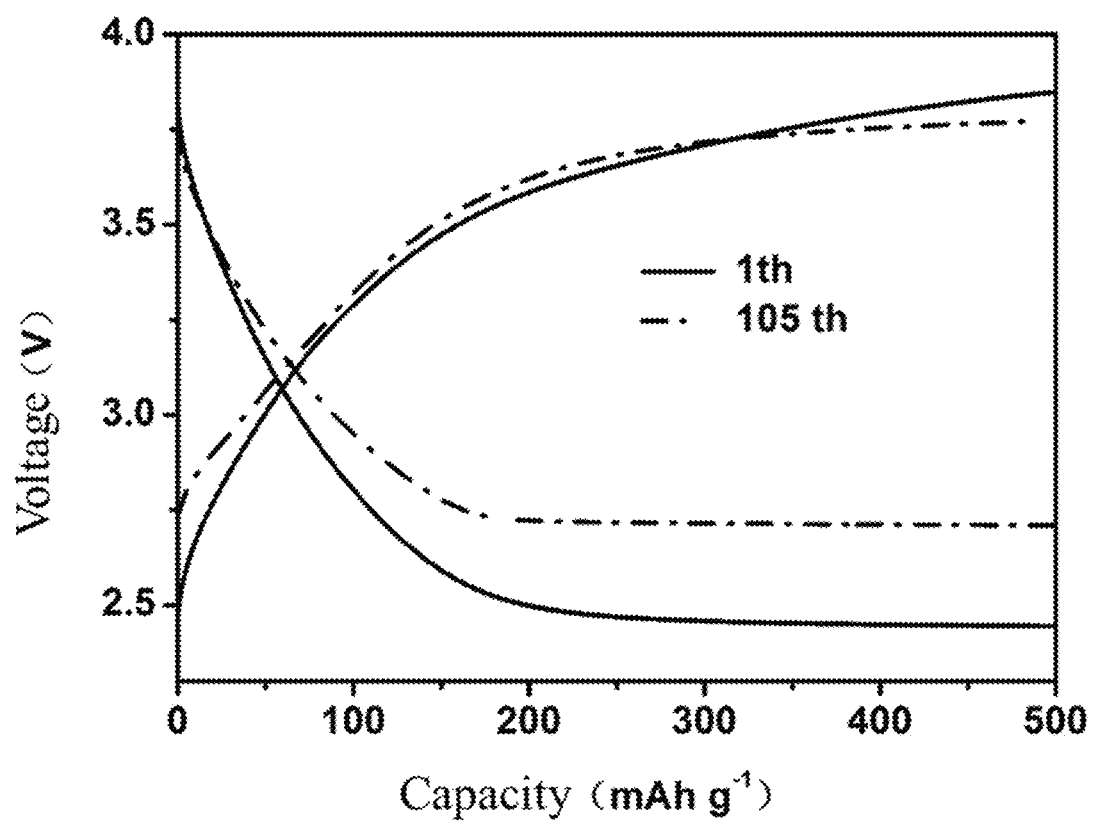
FIG. 10 is a diagram showing the charge-discharge curve of the solid-state sodium-carbon dioxide battery of Example 5.

The solid-state sodium-carbon dioxide battery was placed into a 5 L glass bottle with a cap, and the glass bottle was filled with carbon dioxide gas until the concentration of carbon dioxide reached 90% or more, and then the glass bottle was tightly capped. After the glass bottle and the battery were left to stand for 8 hours, the battery was charged and discharged at room temperature. As shown in FIG. 10, under the conditions of a current density of 100 mA/g and a cut-off capacity of 500 mAh/g, the solid-state sodium-carbon dioxide battery of Example 5 can repeat the charge-discharge cycle up to 105 times.

As shown in the experimental results of the Examples, the solid-state sodium-carbon dioxide batteries of the present invention using sodium metal sheets as the negative electrodes can be subjected to a charge-discharge cycle under a carbon dioxide atmosphere and under a current density of 100 mA/g up to 20 times. In addition, the solid-state sodium-carbon dioxide batteries of the present invention comprising interface layers can be subjected to a charge-discharge cycle under a carbon dioxide atmosphere and under a current density of 100 mA/g up to 50 times. Furthermore, the solid-state sodium-carbon dioxide batteries of the present invention using sodium composite materials as the negative electrodes can be subjected to a charge-discharge cycle under a carbon dioxide atmosphere and under a current density of 100 mA/g up to 105 times. This shows that the solid-state sodium-carbon dioxide batteries of the present invention can achieve the goal of being used under a carbon dioxide atmosphere and is particularly suitable for use as an energy source for Mars exploration applications.

The above examples are used to illustrate the principle and efficacy of the present invention and show the inventive features thereof rather than to limit the protection scope of the present invention. People skilled in this field may proceed with a variety of modifications and replacements based on the disclosures and suggestions of the invention as described. Therefore, the scope of protection of the present invention is that as defined in the claims as appended.

BRIEF DESCRIPTION OF REFERENCE NUMERALS

10: positive electrode
20: negative electrode
30: inorganic solid-state electrolyte
41: positive electrode interface layer
42: negative electrode interface layer

What is claimed is:

1. A solid-state sodium-carbon dioxide battery, which comprises a positive electrode, a negative electrode, an inorganic solid-state electrolyte disposed between the positive electrode and the negative electrode, and at least one of a positive electrode interface layer and a negative electrode interface layer, wherein the positive electrode can catalyze the reaction of sodium ions and carbon dioxide, the positive electrode interface layer is disposed between the positive electrode and the inorganic solid-state electrolyte, and the negative electrode interface layer is disposed between the negative electrode and the inorganic solid-state electrolyte,
wherein the negative electrode comprises sodium and a non-sodium material selected from the group consisting of soft carbon, hard carbon, carbon nanotubes, carbon fiber, coal, asphalt, carbon nitride, carbon quantum dots, and combinations thereof,
wherein the inorganic solid-state electrolyte is selected from the group consisting of Na$_3$Zr$_2$Si$_2$PO$_{12}$, Na$_{11}$Sn$_2$PS$_{12}$, and combinations thereof, and
wherein the materials of the positive electrode interface layer and the negative electrode interface layer are each independently selected from the group consisting of succinonitrile, polyacrylonitrile, polypropylene, polypropylene carbonate, hexafluoropropylene copolymer, sodium perchlorate, sodium hexafluorophosphate, sodium bis(trifluoromethanesulfonyl)imide, sodium bis(fluorosulfonyl)imide, reaction products obtained by co-heating sodium and Na$_3$Zr$_2$Si$_2$PO$_{12}$, and combinations thereof.

2. The solid-state sodium-carbon dioxide battery of claim 1, wherein the material of the positive electrode is selected from the group consisting of MoS2, ZnCo2O4, ZnMn2O4, ZnS, ZnO, NiO, CoP, Ru, Ag, Au, Ir, Pt, Rh, carbon nanotubes, graphite, graphene, soft carbon, hard carbon, hexagonal boron nitride, carbon nitride, carbon quantum dots, and combinations thereof.

3. The solid-state sodium-carbon dioxide battery of claim 1, which comprises the negative electrode interface layer and optionally the positive electrode interface layer.

4. The solid-state sodium-carbon dioxide battery of claim 3, wherein the inorganic solid-state electrolyte is Na$_3$Zr$_2$Si$_2$PO$_{12}$.

5. The solid-state sodium-carbon dioxide battery of claim 4, wherein the materials of the positive electrode interface layer and the negative electrode interface layer are each independently a reaction products obtained by co-heating sodium and $Na_3Zr_2Si_2PO_{12}$.

6. The solid-state sodium-carbon dioxide battery of claim 3, wherein the materials of the positive electrode interface layer and the negative electrode interface layer are each independently a reaction products obtained by co-heating sodium and $Na_3Zr_2Si_2PO_{12}$.

7. The solid-state sodium-carbon dioxide battery of claim 1, wherein the materials of the positive electrode interface layer and the negative electrode interface layer are each independently a reaction product obtained by co-heating sodium and $Na_3Zr_2Si_2PO_{12}$.

8. The solid-state sodium-carbon dioxide battery of claim 1, further comprising a casing, wherein the casing has a closed accommodating space; the positive electrode, the negative electrode, and the inorganic solid-state electrolyte are positioned in the closed accommodating space; and the closed accommodating space is filled with carbon dioxide.

9. The solid-state sodium-carbon dioxide battery of claim 1, wherein the inorganic solid-state electrolyte is $Na_3Zr_2Si_2PO_{12}$.

10. The solid-state sodium-carbon dioxide battery of claim 9, wherein the materials of the positive electrode interface layer and the negative electrode interface layer are each independently a reaction products obtained by co-heating sodium and $Na_3Zr_2Si_2PO_{12}$.

* * * * *